(12) United States Patent
Masterson et al.

(10) Patent No.: US 8,199,820 B2
(45) Date of Patent: *Jun. 12, 2012

(54) INTERMEDIATE COMPRESSION OF REFERENCE FRAMES FOR TRANSCODING

(75) Inventors: Anthony D. Masterson, Saratoga, CA (US); Dzung Tien Hoang, Austin, TX (US)

(73) Assignee: Zenverge, Inc., Santa Clara, CA (US)

( * ) Notice: Subject to any disclaimer, the term of this patent is extended or adjusted under 35 U.S.C. 154(b) by 802 days.

This patent is subject to a terminal disclaimer.

(21) Appl. No.: 12/361,440

(22) Filed: Jan. 28, 2009

(65) Prior Publication Data

US 2009/0196348 A1     Aug. 6, 2009

Related U.S. Application Data

(60) Provisional application No. 61/025,526, filed on Feb. 1, 2008.

(51) Int. Cl.
*H04N 7/12* (2006.01)
*G01R 31/08* (2006.01)

(52) U.S. Cl. ............... 375/240.12; 375/240.03; 370/232

(58) Field of Classification Search ............ 375/240.12, 375/240.16, 240.26, 240.03; 370/232; H04N 7/12; G01R 31/08
See application file for complete search history.

(56) References Cited

U.S. PATENT DOCUMENTS

| | | |
|---|---|---|
| 5,467,134 A | 11/1995 | Laney et al. |
| 5,544,266 A | 8/1996 | Koppelmans et al. |
| 5,838,597 A | 11/1998 | Pau et al. |
| 6,160,844 A | 12/2000 | Wilkinson |
| 6,272,180 B1 | 8/2001 | Lei |
| 6,434,197 B1 | 8/2002 | Wang et al. |
| 7,085,320 B2 * | 8/2006 | Ouyang et al. ............ 375/240.12 |
| 7,116,830 B2 | 10/2006 | Srinivasan |
| 7,143,432 B1 | 11/2006 | Brooks et al. |
| 7,830,800 B1 * | 11/2010 | Masterson et al. ............ 370/232 |
| 8,005,149 B2 * | 8/2011 | Lerner et al. ............. 375/240.26 |
| 2003/0002583 A1 * | 1/2003 | Geerlings ................ 375/240.12 |
| 2003/0028643 A1 | 2/2003 | Jabri |
| 2003/0198293 A1 | 10/2003 | Chen et al. |
| 2005/0053141 A1 | 3/2005 | Holcomb et al. |
| 2005/0232497 A1 | 10/2005 | Yogeshwar et al. |
| 2005/0276323 A1 | 12/2005 | Martemyanov et al. |
| 2005/0281332 A1 | 12/2005 | Lai et al. |
| 2006/0072662 A1 | 4/2006 | Tourapis et al. |
| 2007/0036218 A1 | 2/2007 | Burazerovic |
| 2007/0058718 A1 * | 3/2007 | Shen et al. ............... 375/240.12 |

(Continued)

OTHER PUBLICATIONS

United States Office Action, U.S. Appl. No. 11/567,678, Oct. 18, 2011, 13 pages.

(Continued)

*Primary Examiner* — Gims Philippe
(74) *Attorney, Agent, or Firm* — Fenwick & West LLP

(57) ABSTRACT

A system (and a method) for compressing reference frames in a video transcoder. A transcoder receives a compressed input stream in a first compressed format and output a compressed output stream in a second compressed format. A decoder and an encoder in the transcoder use compressed reference frames. The reference frames are compressed by transforming a block of pixels from a spatial domain to a frequency domain to generate a coefficient array. The coefficient array is quantized and encoded to compress the size of the coefficients array to the size of a fixed bucket. The values of the entropy coded and quantized array are stored in a memory for use in decoding and/or encoding.

18 Claims, 12 Drawing Sheets

U.S. PATENT DOCUMENTS

2007/0280356 A1* 12/2007 Zhang et al. ............. 375/240.16

OTHER PUBLICATIONS

United States Office Action, U.S. Appl. No. 11/448,447, Mar. 30, 2011, 10 pages.
United States Office Action, U.S. Appl. No. 11/448,447, Nov. 18, 2010, 8 pages.
United States Office Action, U.S. Appl. No. 11/567,678, Apr. 29, 2011, 15 pages.
United States Office Action, U.S. Appl. No. 11/486,190, Apr. 25, 2011, 9 pages.
United States Office Action, U.S. Appl. No. 11/486,190, Dec. 17, 2010, 8 pages.
United States Office Action, U.S. Appl. No. 11/611,356, Dec. 10, 2009, 20 pages.
U.S. Office Action, U.S. Appl. No. 11/611,356, Sep. 16, 2009, 18 pages.
U.S. Office Action, U.S. Appl. No. 11/611,356, Apr. 16, 2009, 20 pages.
de With, P.H.N. et al., "An MPEG Decoder with Embedded Compression for Memory Reduction," IEEE Transactions on Consumer Electronics, Aug. 1998, pp. 545-555, vol. 44, No. 3.
Lee, T.Y., "A New Frame-Recompression Algorithm and its Hardware Design for MPEG-2 Video Decoders," IEEE Transactions on Circuits and Systems for Video Technology, Jun. 2003, vol. 13, No. 6, pp. 529-534.
"MPEG-2—The basics of how it works," Hewlett Packard, published at least as early as Oct. 31, 1999, 17 pages.
PCT International Search Report and Written Opinion, PCT/US09/32138, Mar. 25, 2009, 8 pages.
"Streaming Live MPEG-4, The VBasics," VBrick Systems, Inc., 2003, 13 pages.
Wee, S. et al, Compression-Domain Video Processing, Hewlett-Packard Company, 2002, pp. 1-35.
United States Office Action, U.S. Appl. No. 11/486,190, Jan. 3, 2012, 10 pages.
United States Office Action, U.S. Appl. No. 11/567,678, Feb. 13, 2012, 13 pages.

* cited by examiner

| K parameter table 1200 ||
|---|---|
| Q Value 1210 | k parameter 1220 |
| 1 | $\begin{bmatrix} k_{00}^0 & \cdots & k_{0n}^0 \\ \vdots & & \vdots \\ k_{m0}^0 & \cdots & k_{mn}^0 \end{bmatrix}$<br>1220-1 |
| 2 | $\begin{bmatrix} k_{00}^1 & \cdots & k_{0n}^1 \\ \vdots & & \vdots \\ k_{m0}^1 & \cdots & k_{mn}^1 \end{bmatrix}$<br>1220-2 |
| ⋮ | ⋮ |
| N | $\begin{bmatrix} k_{00}^N & \cdots & k_{0n}^N \\ \vdots & & \vdots \\ k_{m0}^N & \cdots & k_{mn}^N \end{bmatrix}$<br>1220-N |

FIG. 12

INTERMEDIATE COMPRESSION OF REFERENCE FRAMES FOR TRANSCODING

CROSS-REFERENCE TO RELATED APPLICATION

This application claims priority under 35 U.S.C. §119(e) to co-pending U.S. Provisional Patent Application No. 61/025,526 entitled "Compressing Reference Frames," filed on Feb. 1, 2008, which is incorporated by reference herein in its entirety.

BACKGROUND

1. Field of the Art

The disclosure herein relates to the field of digital media compression, and more particularly, to compressing reference frames in video.

2. Description of the Related Art

Conventional digital media technology is based mainly around the MPEG-2 (Motion Picture Expert Group) standard or the MPEG-4 Part 2 standard. Significant advancements have been made to media compression technology with the more recent development of H.264, also known as MPEG-4 Part 10 or MPEG-4 AVC. The H.264 format is able to code media in a more highly compressed form which reduces memory requirements and improves network performance. However, media consumers and producers may be reluctant to transition to the new standard because of the costs associated with replacing the existing MPEG compatible media and media players. The transition can be eased by making the new technology compatible with existing technology. In some instances, compatibility is enhanced by designing systems that can perform conversions between different compressed media standards.

Transcoders are devices configured to convert media from a first compressed format to a second compressed format. A transcoder consists of a decoder to decode a compressed input media stream of a first compressed format (such as MPEG-2) into an intermediate format, a processing unit to process the media stream in its intermediate form, and an encoder to encode the processed media stream into a compressed output stream of a second compressed format (such as H.264). The processing unit may perform various operations on the media stream such as video scaling.

Traditional decoders, encoders, and transcoders rely on uncompressed "reference frames" in the encoding and decoding processes. In conventional video compression, movement from frame to frame is encoded by a motion vector and an error term. The motion vector describes the relative position of a macroblock in the current frame to a similar macroblock-sized region in a reference frame. The error term gives the difference between the current macroblock and the referenced macroblock-sized region. Since predicted frames rely on the reference frames as a basis for encoding and decoding the image, any errors in the reference frames can propagate to the other frames. This problem, known as drift, can create artifacts in the video stream. In a conventional decoder, the reference frames are typically stored uncompressed in order to preserve video quality.

However, uncompressed media frames, especially video, require bulky processing hardware to handle the high bandwidth for data transfers. Uncompressed video also requires significant amounts of storage. This increases system cost. In addition, the performance of the transcoder suffers since the uncompressed frames take up significantly more bandwidth than compressed frames.

SUMMARY

Embodiments relate to a system (and a method) configured to compression of reference frames in a transcoder. The transcoder may include a decoder and an encoder. The decoder receives a compressed input stream in a first compressed format. The decoder decodes the compressed input stream to an intermediate stream. During the decoding, first reference frames in the compressed input stream are compressed into intermediate compressed reference frames in an intermediate format. The encoder receives the intermediate stream and encodes the intermediate stream to generate a compressed output stream in a second compressed format. During the encoding, the intermediate compressed reference frames are compressed to the second compressed format.

In one embodiment, the first reference frames is compressed to the intermediate compressed reference frames by first extracting a two-dimensional block of pixels from a reference frame. Then the two-dimensional block of pixels is transformed from a spatial domain to a frequency domain to generate a coefficient array. The coefficient array is compressed to fit in a fixed bucket size. The compressed coefficient array is stored in a reference frame storage.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The disclosed system and method has other advantages and features which will be more readily apparent from the following detailed description and the appended claims, when taken in conjunction with the accompanying drawings, in which:

FIG. (or FIG.) 1 is a block diagram illustrating one embodiment of a transcoder for converting a compressed media stream from a first compressed format to a second compressed format.

FIG. 12 is an embodiment of a k parameter table for encoding frequency coefficients.

DETAILED DESCRIPTION

Figure 1:
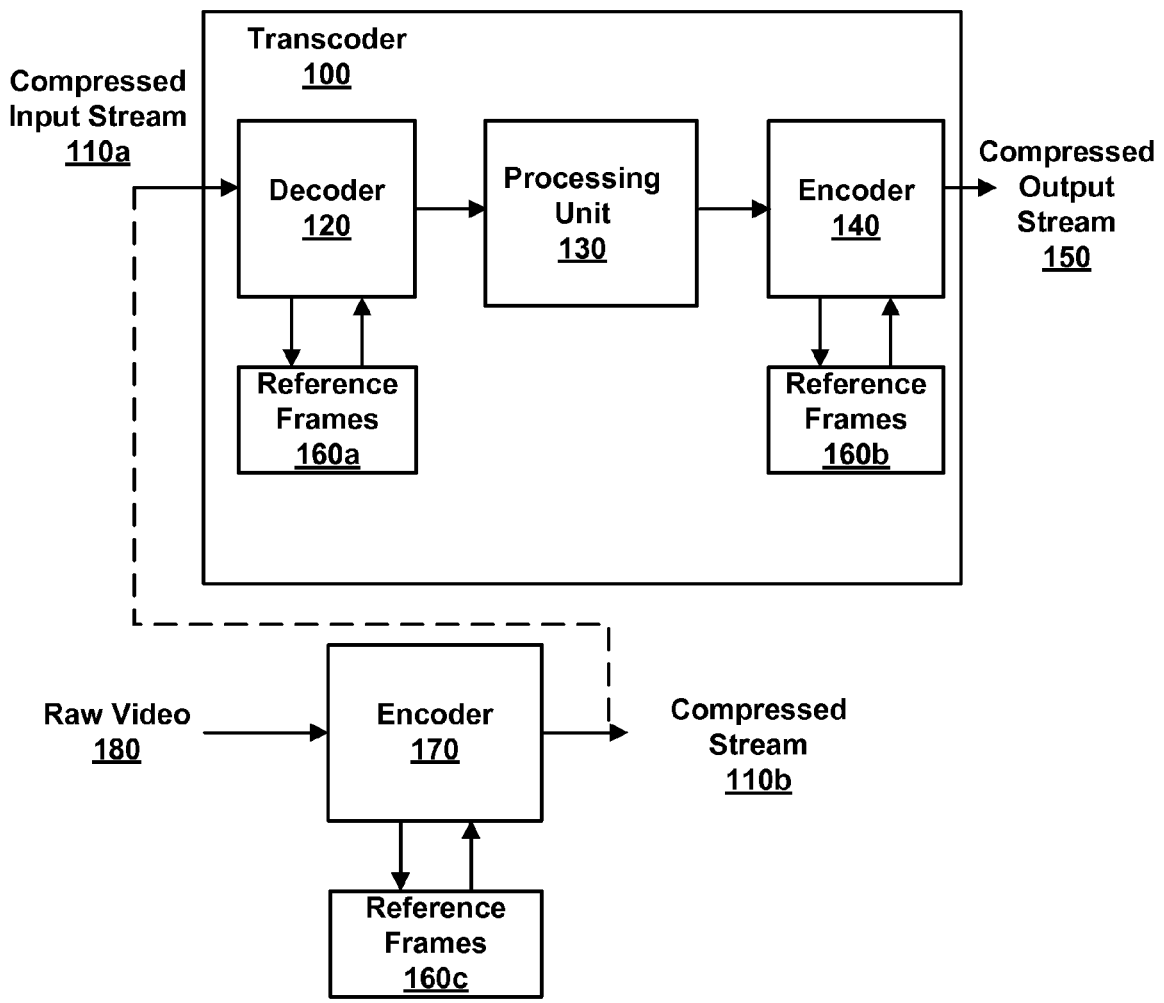

A system (and method) as disclosed herein includes a configuration for decoding and/or encoding video using reference frames stored in a compressed format. Referring first to FIG. (FIG.) 1, a block diagram illustrates a transcoder for processing, e.g., converting, a compressed media stream from a first compressed format to a second compressed format in accordance with one embodiment. The FIG. 1 illustrates a transcoder 100 coupled with a source of compressed video, e.g., an encoder 170.

The transcoder 100 includes a decoder 120, a processing unit 130, and an encoder 140. The decoder 120 couples an input line to receive (or input) a compressed input stream 110a in a first compressed format. The decoder 120 is coupled to a first reference frame storage 160a for decoding the compressed input stream 110a into decoded frames. The decoder 120 outputs the decoded frames to a processing unit 130. The processing unit 130 processes the decoded frames and outputs to the encoder 140. The encoder 140 is coupled to a second reference frame storage 160b and an output line for a compressed output stream 150. The first and the second reference frame storage 160a and 160b may be any device capable of storing data including, among others, a memory, a buffer, or a register device. In one embodiment, reference frames are stored in reference frame storage 160a and 160b in a compressed format as described below in detail.

In one embodiment, the compressed stream 110a may be generated by an encoder 170 that is remote from the transcoder 100. The encoder 170 couples an input line to receive raw video 180, and an output line to output a compressed stream 110b. Generally, the encoder 170 compares a frame of video to a previous or future frame (i.e. a reference frame) and generates motion vectors describing the relative movement of macroblocks between the reference frame and the frame being encoded. The encoder 170 further outputs an error term and/or other compression parameters that allow the original frame of video to be reconstructed from the motion vectors and the reference frame. The encoder 170 additionally generates new reference frames from the raw video 180 to be used in encoding future frames. The encoder 170 stores references frames in a third reference frame storage 160c for use in the encoding process. The third reference frame storage 160c may be any device capable of storing data including, among others, a memory, buffer, or register device. According to one embodiment, reference frames are stored in reference frame storage 160c in a compressed format. The compressed stream 110b from the encoder 170 can be, for example, stored for later playback or transmitted over a network to a playback device or a processing device (such as the transcoder 100).

The transcoder 100 receives the compressed input stream 110a from a compressed video source, such as, for example, the compressed stream 110b from the encoder 170. In one embodiment, the compressed input stream 110a is the same as compressed stream 110b and is collectively referenced herein as compressed input stream 110. In one embodiment, the compressed input stream 110 is in MPEG-2 format. In alternative embodiments, the compressed input stream 110 is in a different format such as MPEG-1 (Motion Picture Expert Group, layer 1), MPEG-2, MPEG-4, MP3 (MPEG 1, layer 3 audio), H.263, H.264, AVI (Audio Video Interleaved), VC-1 (Video Codec 1), DV (Digital Video), AVS (Audio Video Standard), JPEG (Joint Photographic Experts Group), a RealVideo format, a Windows Media Player format, other video formats, other audio formats, or the like.

The decoder 120 decodes the compressed input stream 110 into an intermediate stream. Generally, the decoder 120 receives a reference frame and receives motion vectors and other compression parameters from the compressed input stream 110. The reference frames are received from time to time from the compressed input stream 110a or can be received from reference frame storage 160a. The motion vectors along with a compressed error signal describe how macroblocks from one frame are related to macroblocks of a previous or subsequent frame (e.g., the reference frame). Thus, by applying the motion vectors and compressed error signal to the reference frame, the decoder 120 produces a new decoded frame. Some decoded frames can then be stored in reference frame storage 160a for use as reference frames in decoding future frames. In contrast to conventional systems, the decoder 120 can store the reference frames in a compressed format.

In one embodiment, the decoder 120 receives reference frames from the compressed input stream 110 in a compressed format (e.g., from the encoder 170). The decoder 120 decodes the input stream 110 and stores the references frames to reference frame storage 160a using the same compression format as used by the encoder 170. Because frames are decoded using reference frames that are compressed according to the same compression process used in the encoder 170, there is no drift between reference frames of the encoder 170 and the reference frames of the decoder 120. This advantageously reduces or eliminates perceivable artifacts in the video signal that can result from mismatch between the reference frames produced by the encoder 170 and the reference frames produced by the decoder 120. In one embodiment, the decoder 120 can comprise a de-ring filter to further reduce artifacts resulting from reference frame compression.

In one embodiment, the decoded stream outputted by the decoder 120 is in an intermediate compressed format and includes compressed reference frames. For example, in one embodiment, the decoder 120 is configured to decode an MPEG-2 format stream into a custom format stream that includes pixel data and compression parameters such as quantization values and motion vectors.

The decoded stream is outputted to the processing unit 130. The processing unit 130 processes the video stream while in the intermediary compressed format. Processing can include, for example, scaling, color conversion, frame rate conversion, etc. The processed video stream is outputted to the encoder 140. The encoder 140 encodes the compressed video stream to generate a compressed output stream 150 in a second compressed format. The encoder 140 can generally operate similarly to the encoder 170 previously described. In one embodiment, the compressed output stream 150 is in H.264 format, although other compressed formats are also possible, e.g., MPEG-1 (Motion Picture Expert Group, layer 1), MPEG-2, MPEG-4, MP3 (MPEG 1, layer 3 audio), H.263, AVI (Audio Video Interleaved), VC-1 (Video Codec 1), DV (Digital Video), AVS (Audio Video Standard), JPEG (Joint Photographic Experts Group), a RealVideo format, a Windows Media Player format, other video formats, other audio formats, and the like.

The encoder 140 generates reference frames and stores the reference frames in reference frame storage 160b for use in the encoding process. In one embodiment, the reference frames stored in reference frame storage 160b are stored in a compressed format. By using compressed storage, the memory storage and bandwidth needed by encoder 140 is reduced. In one embodiment, the encoder 140 stores reference frames in the same compressed format as used by the decoder 120.

Figure 2:
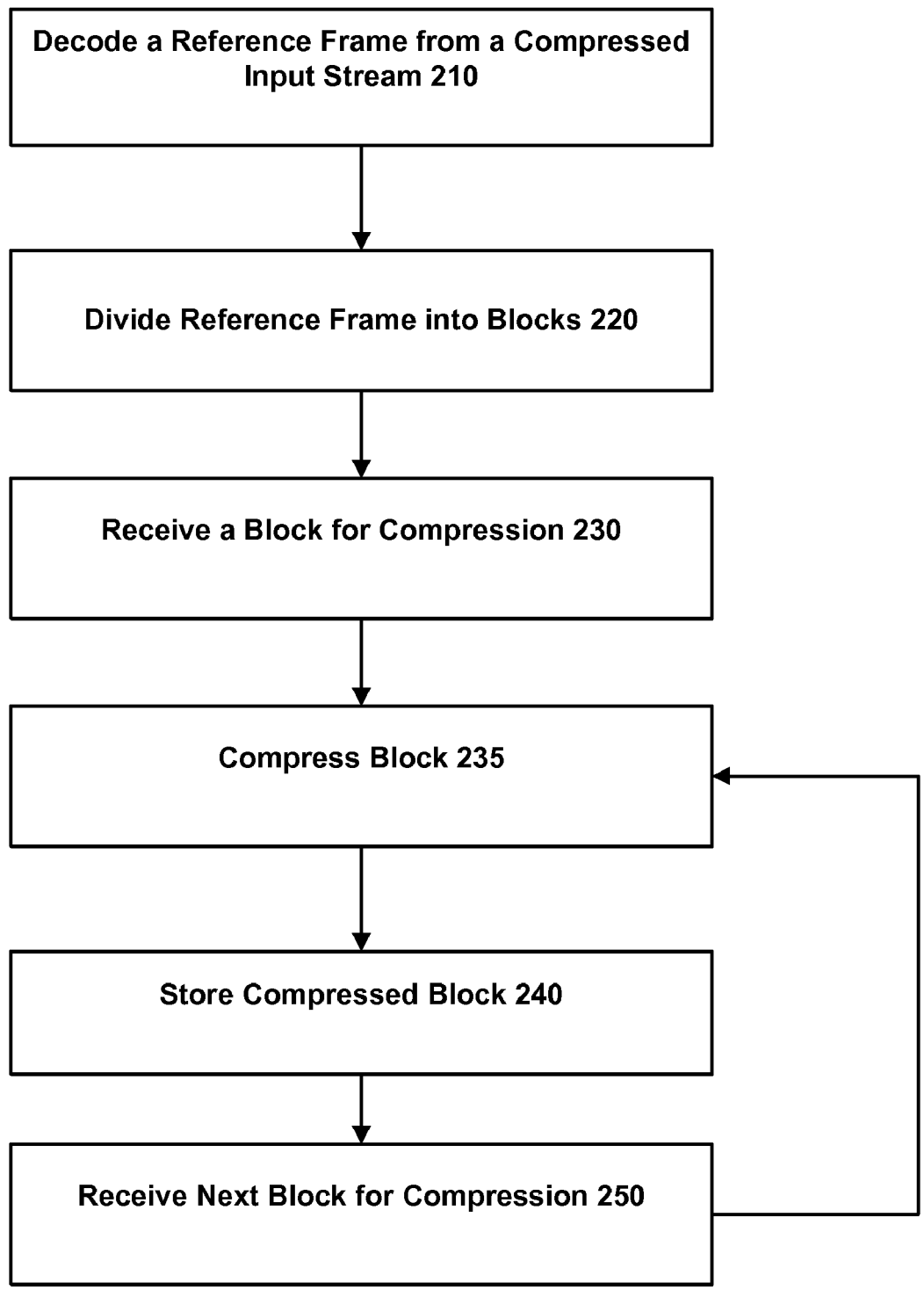
FIG. 2 is a flow diagram illustrating one embodiment of a method for compressing reference frames.

Turning now to FIG. 2, a flow diagram illustrates a method for compressing reference frames in accordance with one embodiment. Although, the process is described as being performed in the decoder 120 of the transcoder 100, the method can also be performed by the encoder 140 and/or the external encoder 170 to compress reference frames. The process starts and the decoder 120 decodes 210 a reference frame from a compressed input stream 110. The decoded reference frame is divided 220 into blocks of pixels. The size of the block of pixels (block size) may be predetermined and may be based on standard macroblocks, sub-divided sections of macroblocks, or other blocks of pixels composing a section of the reference frame. In one embodiment, the block is an 8×4 block of pixels. In another embodiment, the block is a 4×4 block of pixels.

Continuing with the process, the decoder 120 receives 230 a block of the reference frame for compression. The reference frame for compression is included in the compressed input stream 110a. The decoder 120 compresses 235 the block according to a reference frame compression method and stores 240 the compressed block in the reference frame storage 160a. The decoder 120 receives 250 the next block for compression and repeats the steps 235, 240, 250 for all the blocks in the reference frame.

Figure 3:
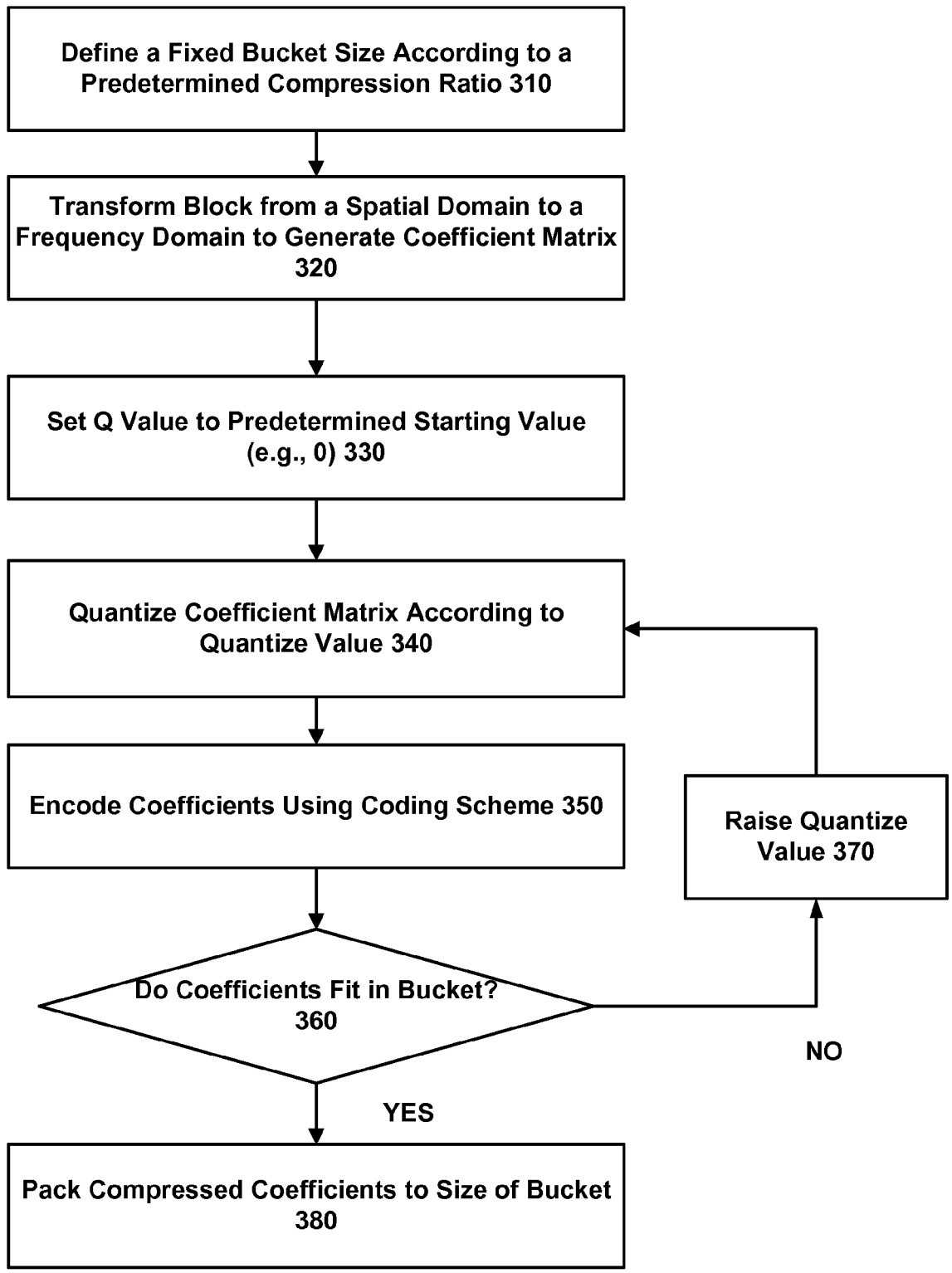
FIG. 3 is a flow diagram illustrating one embodiment of compressing a block of pixels using quantization and encoding.

An example method for compressing 235 blocks of a reference frame is illustrated in FIG. 3. Although, the process is described as being performed in the decoder 120, the encoder 140 and/or the external encoder 170 can perform similar compression processes. The decoder 120 defines 310 a fixed bucket size according to a predetermined compression ratio (e.g., a 2:1 compression ratio). For example, in one embodiment, the decoder 120 receives an 8×4 pixel block (32 bytes) and compresses the block according to a 2:1 compression ratio to fit to a 16-byte bucket. In another embodiment, the decoder 120 receives a 4×4 pixel block (16 bytes) and compresses the block according to a 2:1 compression ratio to fit to an 8-byte bucket. The compression ratio can be based on various factors including, for example, available memory space, available bandwidth, and the acceptable level of perceived quality loss.

The process continues with transforming 320 the block from a spatial domain to a frequency domain. A variety of applicable transforms are known in the art including Fourier transforms, Discrete Cosine Transforms, Hadamard Transforms, and other related transforms. In one embodiment, a DC preserving modified Hadamard transform (DC-MHT) is used as described below in detail. The advantages of using DC-MHT include, among others, that only additions, subtractions, and shifts are used for computation. Therefore, DC-MHT may be implemented with less complexity compared to other transforms such as DCT and DFT. A 2×1 DC-MHT is given as follows:

$$h_0 = x_0 + x_1 \quad (1)$$
$$h_1 = \left\lfloor \frac{x_0 - x_1}{2} \right\rfloor = (x_0 - x_1) >> 1$$

The inverse of the DC-MHT is given by:

$$x_0 = h_1 + \left\lfloor \frac{h_0 + 1}{2} \right\rfloor = h_1 + ((h_0 + 1) >> 1) \quad (2)$$
$$x_1 = h_0 - x_0$$

The DC-MHT differs from a conventional MHT in that the arithmetic right shift operation is performed on the difference signal $(x_0-x_1)$ instead of the sum $(x_0+x_1)$. This is advantageous because the DC-MHT maintains a constant block DC even when non-DC coefficients are quantized. If the DC coefficient is not quantized, the average pixel value for the block can be maintained after compression and decompression. Furthermore, unlike a conventional MHT, the DC-MHT is idempotent to repeated compression with the same quantizer, assuming there is no clamping of the reconstructed pixel values. This means that a block can undergo repeated compression under the DC-MHT while maintaining the same result as after the first compression. In this way, drift due to repeated compression of the same block content may be reduced or eliminated.

Figure 4:
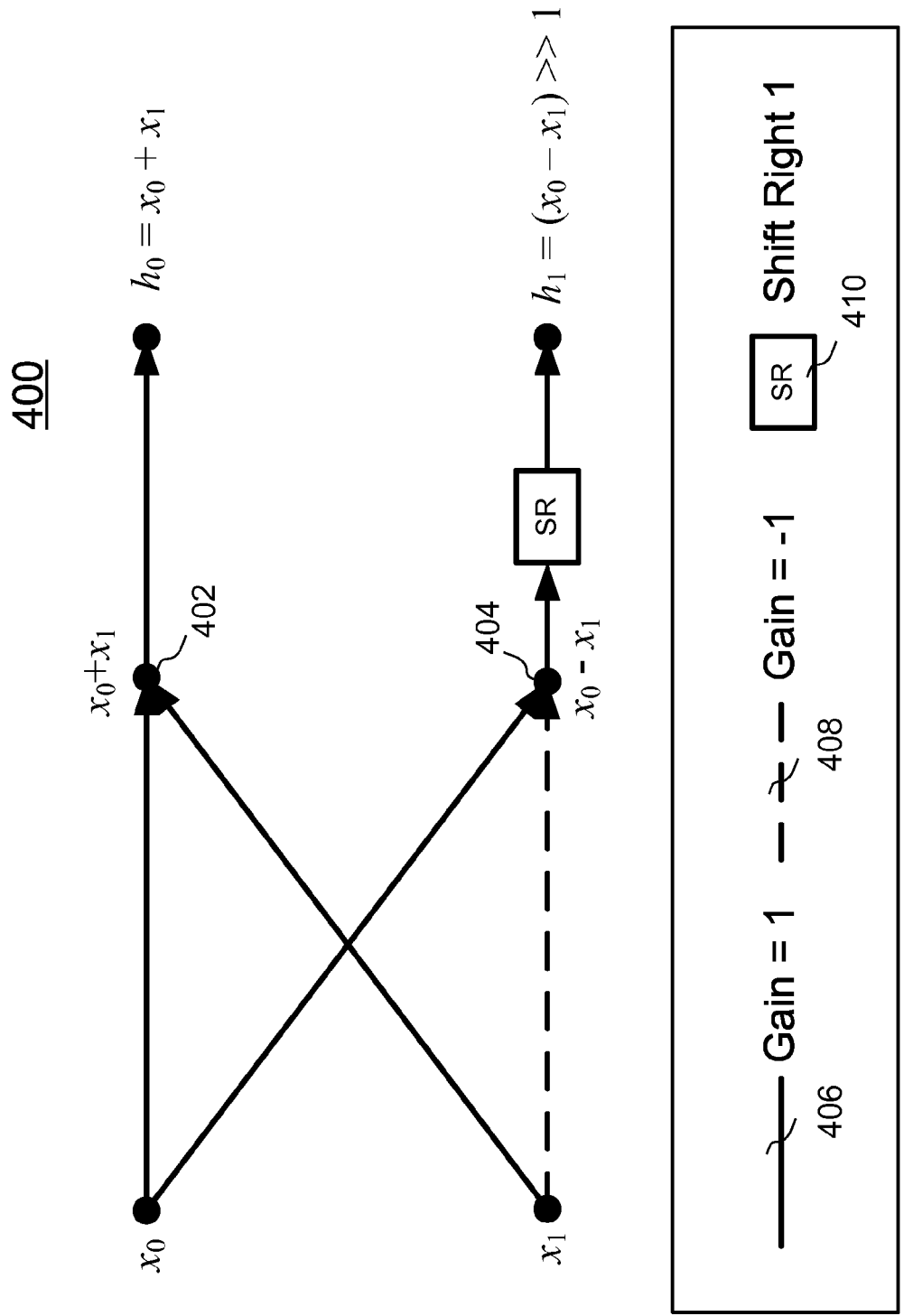
FIG. 4 is an embodiment of a signal flow diagram illustrating computation of a 2×1 DC preserving Modified Hadamard Transform.

The computation of the 2×1 DC-MHT can also be visually represented by a signal flow diagram 400 as illustrated in FIG. 4. The signal flow diagram 400 provides a convenient visual representation of the transform that can be particularly helpful as the dimensionality of the transform increases. The signal flow diagram 400 shows, from left to right, the operations performed to transform the inputs $x_0$, $x_1$ to the outputs $h_0$, $h_1$. Each line in the signal flow diagram 400 corresponds to a multiply value (gain). Solid lines 406 introducing a gain of 1 to the signal and dashed lines 408 introducing a gain of −1 to the signal. At each node (e.g., nodes 402 and 404), signals entering the node from the left are added together and the sum is outputted to the right of the node. A shift block 410 indicates a binary arithmetic right shift (i.e. a binary division by 2) of the signal entering the block 410 from the left. In FIG. 4, for example, solid lines 406 from input signals $x_0$ and $x_1$ are added together at node 402. The sum $x_0+x_1$ is outputted from the node 402 to produce coefficient $h_0$. Input signal $x_1$ is negated (represented by dashed line 408) as it enters node 404 and is added to input signal $x_0$. The output of node 404 $(x_0-x_1)$ is right shifted by the shift block 410 to produce output coefficient $h_1$.

Figure 5:
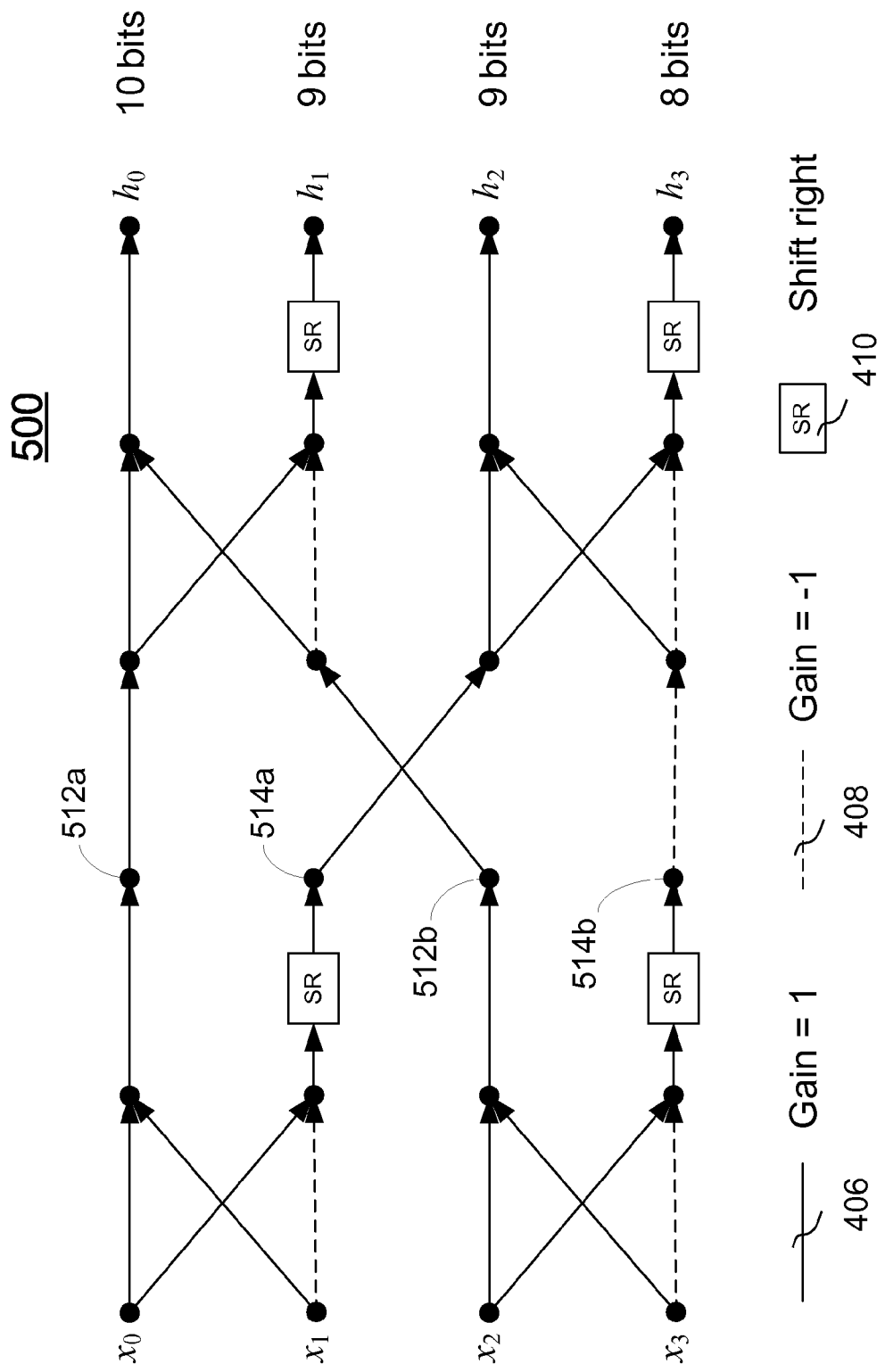
FIG. 5 is an embodiment of a signal flow diagram illustrating computation of a 4×1 DC preserving Modified Hadamard Transform.

In one example, the 2×1 DC-MHT is used as building blocks to construct larger DC-MHTs. For example, the signal flow diagram 500 of FIG. 5 illustrates a 4×1 DC-MHT computation. Here a 4×1 pixel input $[x_0, x_1, x_2, x_3]$ is transformed to generate a 4×1 array of coefficients $[h_0, h_1, h_2, h_3]$. The 4×1 DC-MHT computation may be performed by two levels of consecutive 2×1 DC-MHT computation. At the first level, two pairs of input signals $[x_0, x_1]$, $[x_2, x_3]$ are 2×1 DC-MHT transformed as described above with reference to FIG. 4. Each 2×1 DC-MHT transform produces first outputs at first nodes 512a, 512b and second outputs at second nodes 514a, 514b. At the second level, the first outputs at first node 512a, 112b are again 2×1 DC-MHT transformed to produce coefficients $h_0$ and $h_1$. The second outputs at second nodes 514a, 514b are also 2×1 DC-MHT transformed to produce coefficients $h_2$ and $h_3$. When each input $x_0$, $x_1$, $x_2$, $x_3$ consists of 8-bit integer values, coefficients $h_0$, $h_1$, $h_2$, $h_3$ include 10 bits, 9 bits 9 bits and 7 bits respectively.

Figure 6:
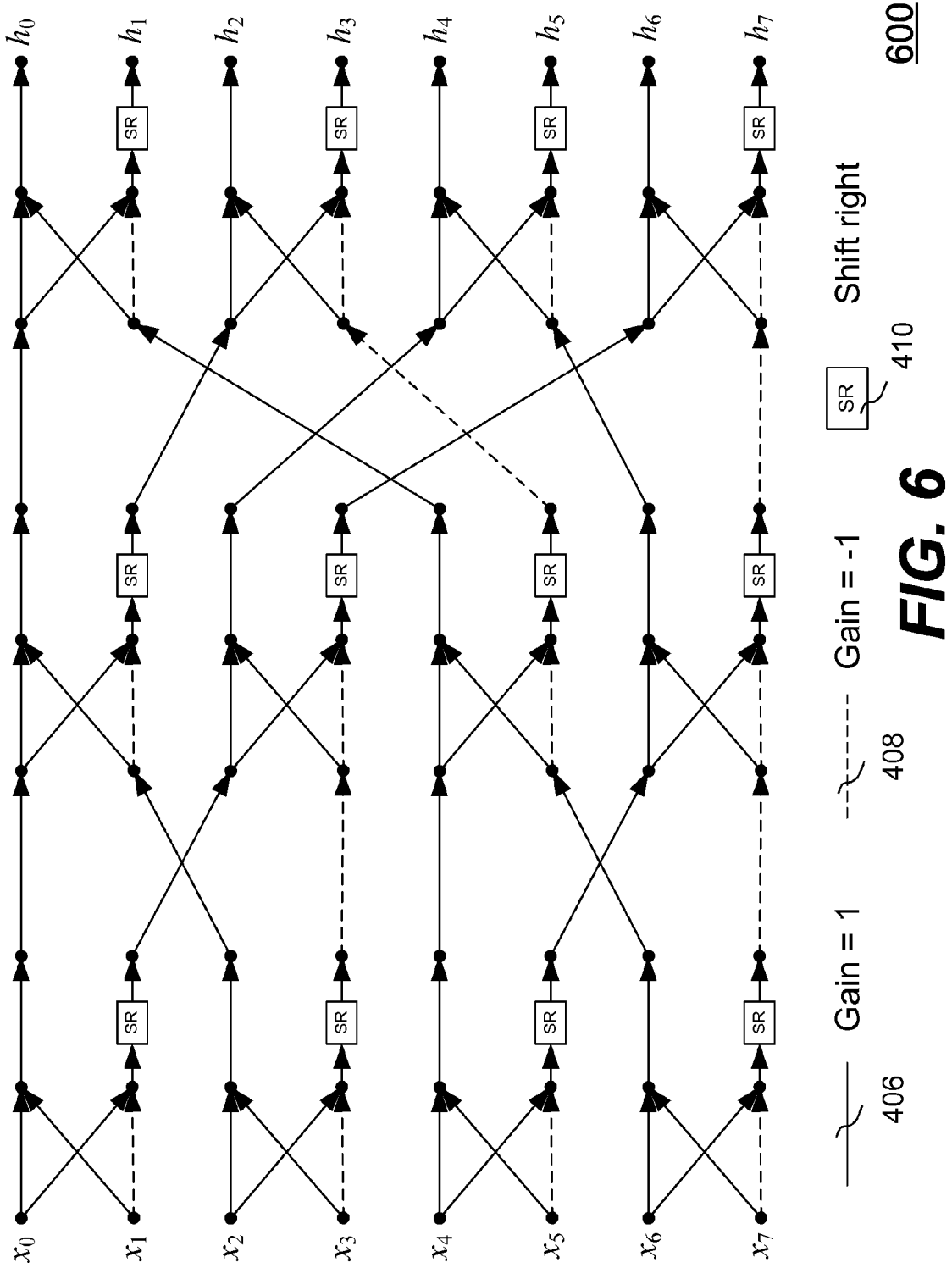
FIG. 6 is an embodiment of a signal flow diagram illustrating computation of an 8×1 DC preserving Modified Hadamard Transform.
Figure 7:
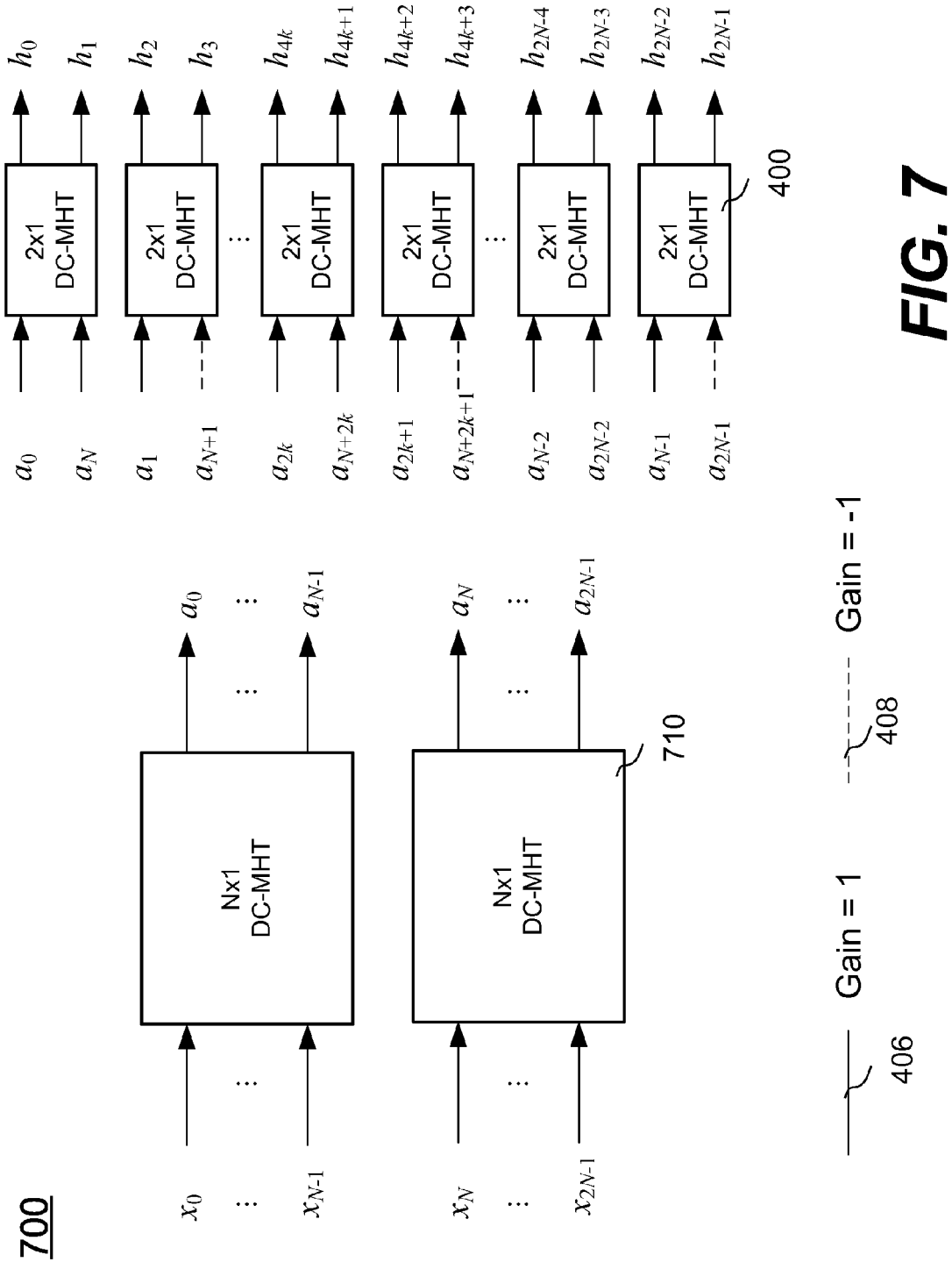
FIG. 7 is an embodiment of a signal flow diagram illustrating recursive computation of a 2N×1 DC preserving Modified Hadamard Transform using N×1 DC preserving Modified Hadamard Transform and 2×1 DC preserving Modified Hadamard Transform blocks.

FIG. 6 illustrates a signal flow diagram 600 for another example where computation of an 8×1 DC-MHT transform is performed to generate coefficients $[h_0, h_1, \ldots, h_7]$ from 8×1 input block $[x_0, x_1, \ldots, x_7]$. In 8×1 DC-MHT transform, three levels of 2×1 DC-MHT transform are performed as illustrated in FIG. 6. FIG. 7 illustrates a signal flow diagram 700 showing recursive computation of a 2N×1 DC-MHT transform by connecting two N×1 DC-MHT transforms 710 and N 2×1 DC-MHT transforms 400. The recursive computation can be "unwound" to generate a signal flow diagram for a DC-MHT transform of any length greater than two that is a power of two.

The DC-MHT can be expanded further to implement a two-dimensional transform. In one embodiment, an 8×4 DC-MHT transform is implemented by first computing an 8×1 DC-MHT on each of the 4 rows of input. The 4 rows of computed coefficients form an intermediate coefficient array. A 4×1 DC-MHT is then computed on each of the columns of the intermediate coefficient array. The results of the 4×1 DC-MHT form the final 8×4 coefficient array.

The DC-MHT is not a linear transform and the order of operations can change the results. In another embodiment, an 8×4 DC-MHT is implemented by first computing a 4×1 DC-MHT on each of the 8 columns. The 8 columns of computed coefficients form an intermediate coefficient array. An 8×1 DC-MHT is then computed on each of the rows of the intermediate coefficient array, and the results form the final 8×4 coefficient array.

Figure 8:
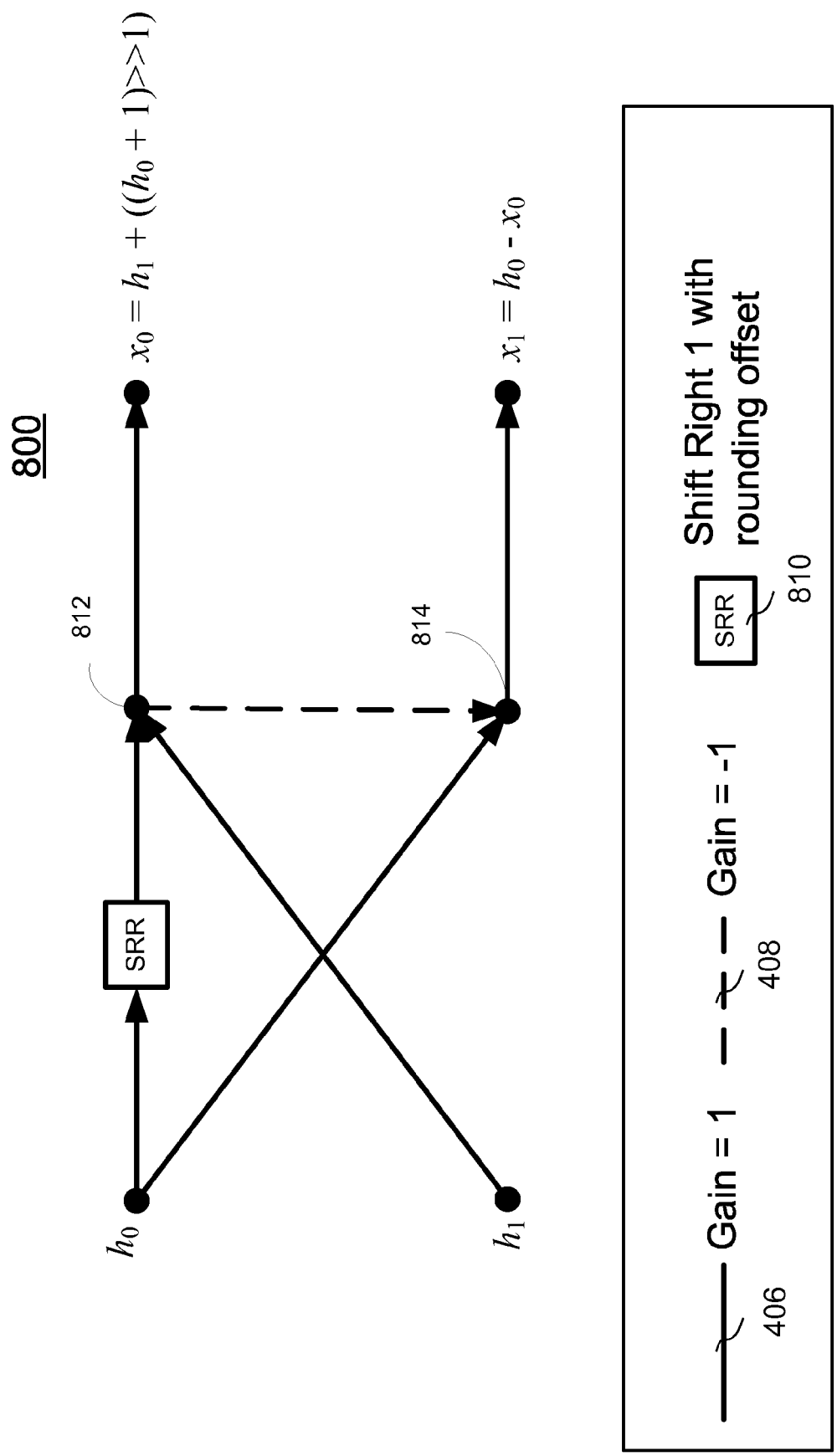
FIG. 8 is an embodiment of a signal flow diagram illustrating computation of a 2×1 Inverse DC preserving Modified Hadamard Transform.

The computation of the 2×1 Inverse DC-MHT given in Equation (2) can also be visually represented by a signal flow diagram 800 as illustrated in FIG. 8. Block 810 indicates an "addition by 1 followed by right shift by 1" operation that is abbreviated as SRR. For 2×1 Inverse DC-MHT transform, coefficients $h_0$ and $h_1$ provided as inputs and coefficients $x_0$ and $x_1$ are provided as outputs. The signal flow diagram 800 shows, from left to right, the operations performed to transform the inputs $h_0$, $h_1$ to the outputs $x_0$, $x_1$. Each line in the signal flow diagram 800 corresponds to a multiply value (gain). Solid lines introduce a gain of 1 to the signal and dashed lines introduce a gain of −1 to the signal. At each node (e.g., nodes 812 and 814), signals entering the node from the left are added together and the sum is outputted to the right of the node. A shift block 810 indicates a binary arithmetic right shift with rounding offset. At node 812, the input signal $h_0$ via the shift block 810 is added together with the input signal $h_1$. The resulting $x_0 = h_1 + (h_0 + 1)$ is output from the node 812. At node 814, the input signal h0 is added with the output from the node 812. The resulting $x_1 = h_0 − x_0$ is output from the node 814.

Figure 9:
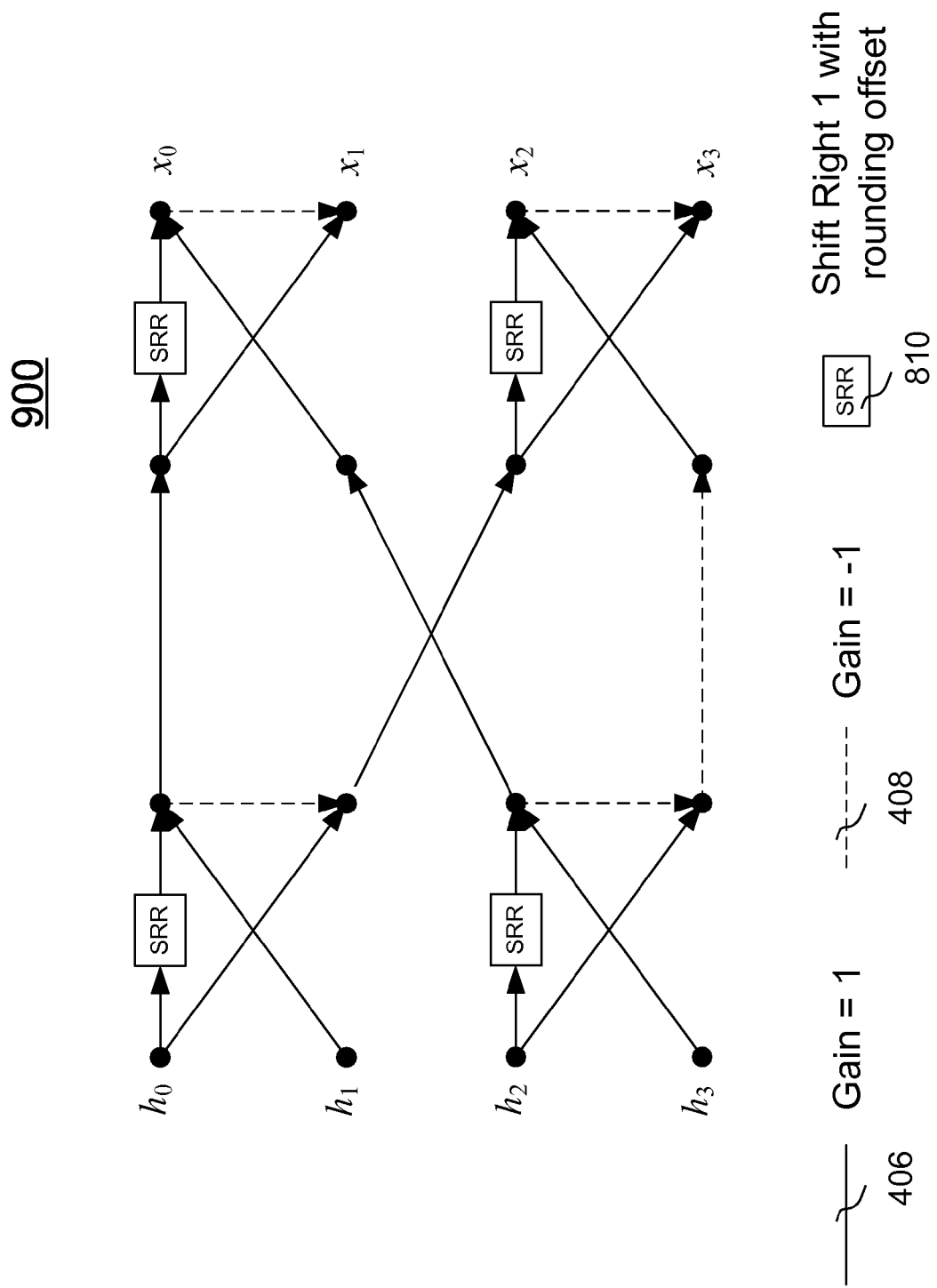
FIG. 9 is an embodiment of a signal flow diagram illustrating computation of a 4×1 Inverse DC preserving Modified Hadamard Transform.
Figure 10:
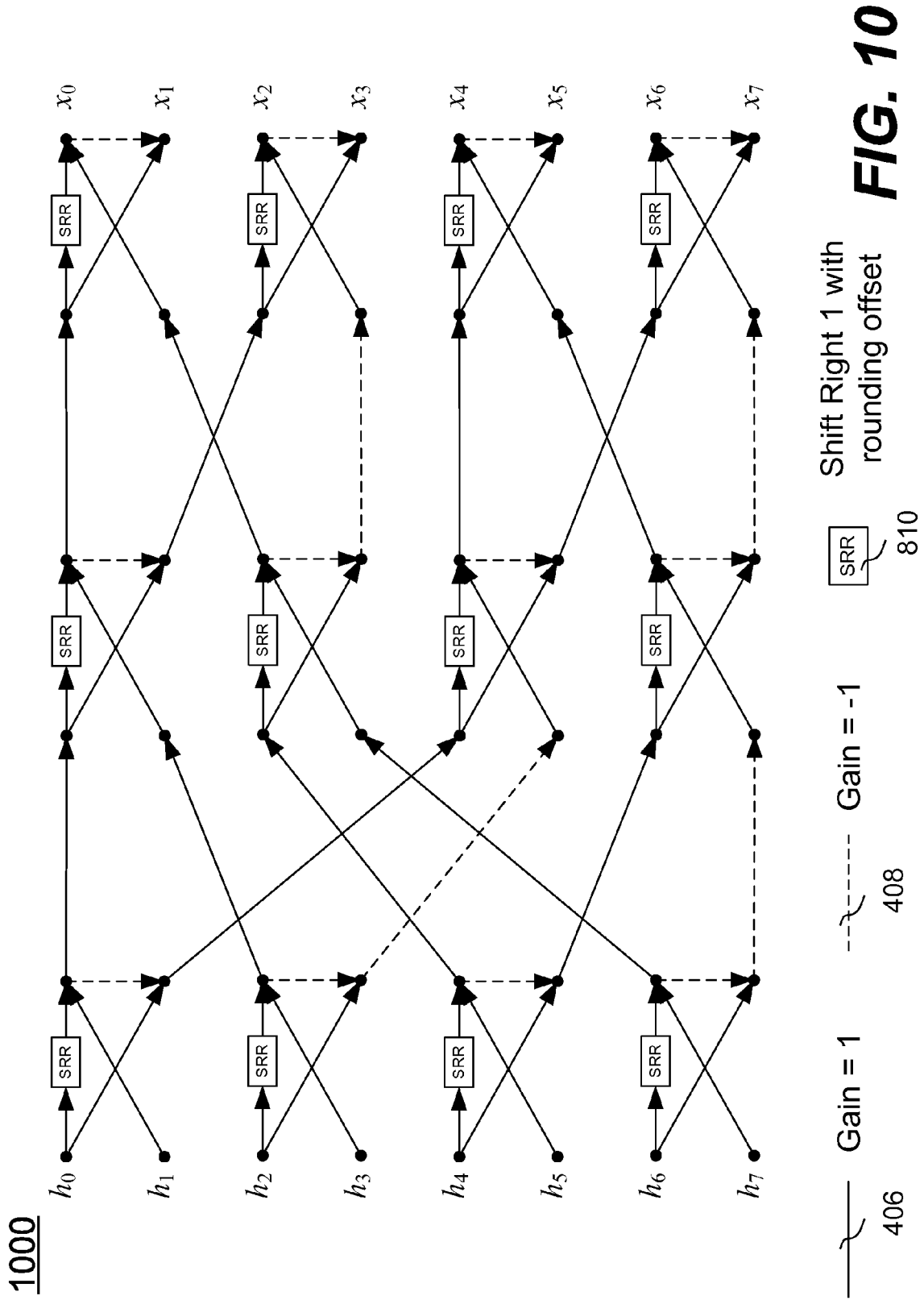
FIG. 10 is an embodiment of a signal flow diagram illustrating computation of an 8×1 Inverse DC preserving Modified Hadamard Transform.
Figure 11:
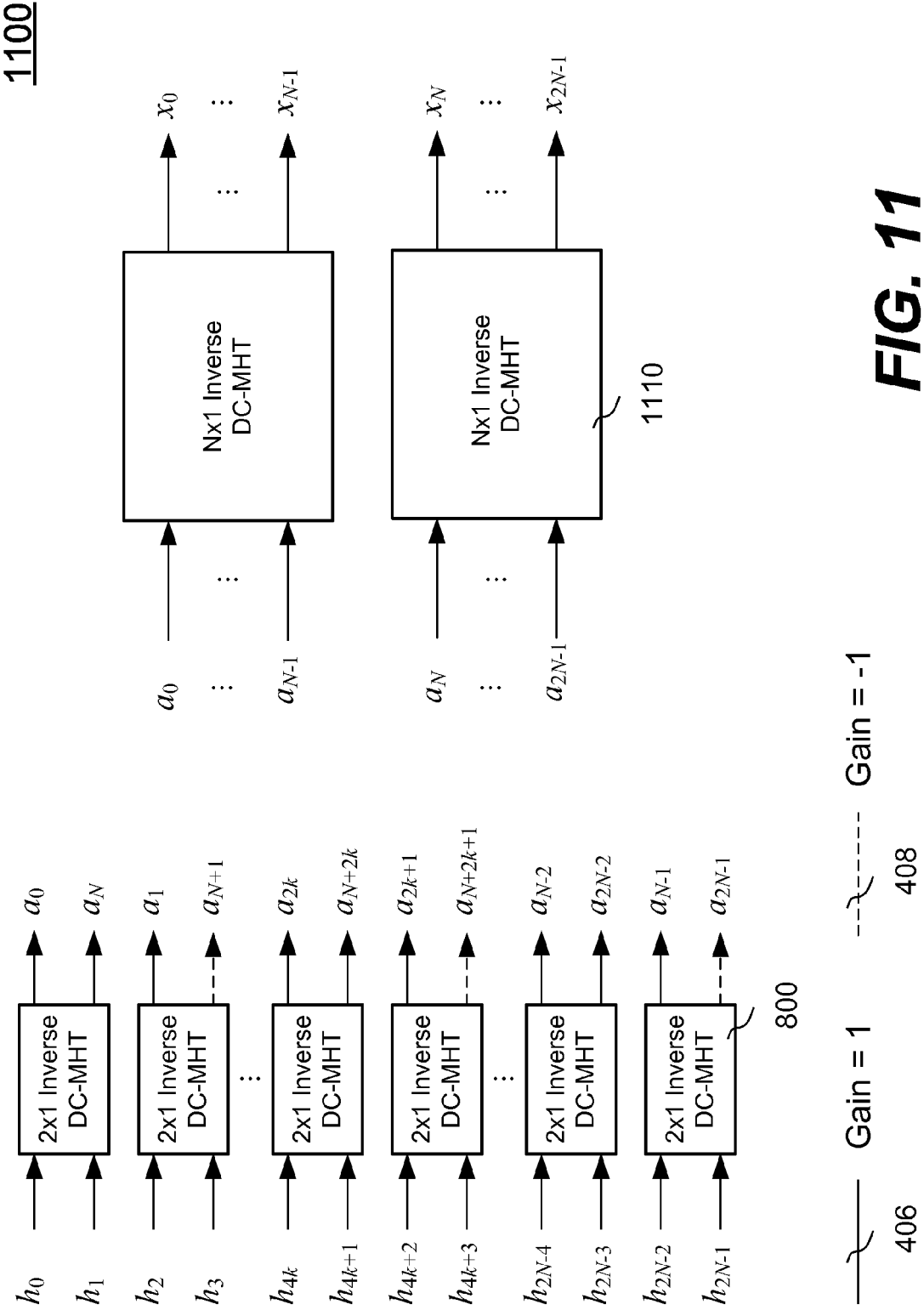
FIG. 11 is an embodiment of a signal flow diagram illustrating recursive computation of a 2N×1 Inverse DC preserving Modified Hadamard Transform using N×1 Inverse DC preserving Modified Hadamard Transform and 2×1 Inverse DC preserving Modified Hadamard Transform blocks.

FIG. 9 illustrates a signal flow diagram 900 showing computation of a 4×1 Inverse DC-MHT transform to generate 4×1 block $[x_0, x_1, \ldots, x_3]$ from 4×1 coefficients $[h_0, h_1, \ldots, h_3]$. FIG. 10 illustrates a signal flow diagram 1000 showing computation of an 8×1 Inverse DC-MHT transform to generate 8×1 block $[x_0, x_1, \ldots, x_7]$ from 8×1 coefficients $[h_0, h_1, \ldots, h_7]$. FIG. 11 illustrates a signal flow diagram 1100 showing recursive computation of a 2N×1 Inverse DC-MHT transform by connecting N 2×1 Inverse DC-MHT transforms 800 and two N×1 Inverse DC-MHT transforms 1110.

Because the DC-MHT and the Inverse DC-MHT are not linear transformations, they must be constructed so that the signal flow through the Inverse DC-MHT is a mirror of the signal flow through the (forward) DC-MHT. That is, the 2×1 DC-MHT and the 2×1 Inverse DC-MHT may be considered as atomic computation, and therefore, 2×1 DC-MHT and the 2×1 Inverse DC-MHT are processed in sequences so that they mirror each other.

As with the DC-MHT, the Inverse DC-MHT can be expanded to implement a two-dimension inverse transform. For example, an 8×4 Inverse DC-MHT corresponding to the inverse of the 8×4 DC-MHT where an 8×1 DC-MHT is computed on each of the 4 rows of input can be constructed by first computing a 4×1 Inverse DC-MHT on each of the columns of input coefficients to form an intermediate array. An 8×1 Inverse DC-MHT is then computed on each row of the intermediate array to form the final 8×4 results array.

Similarly, an 8×4 Inverse DC-MHT corresponding to the 8×4 DC-MHT where an 4×1 DC-MHT is first computed on each of the 8 columns can be constructed by computing an 8×1 Inverse DC-MHT on each of the rows of input followed by a 4×1 Inverse DC-MHT on each of the columns of intermediate results.

Other variations of DC-MHTs such as using permutations of the input signals and/or permutations of the output signals are also possible. Other sizes of DC-MHT, such as 4×4 and 16×16 are also possible.

In one embodiment, the transformation 320 also includes normalizing the array of coefficients. Assuming that the input values are 8-bit unsigned integers, the coefficients may be normalized, for example, by subtracting 128 from the coefficient array to convert the values to 8-bit signed integers. This can also be implemented by simply inverting the most significant bit (MSB) of the coefficient values.

Returning to FIG. 3, after obtaining the array of coefficients, a quantize value ("Q value") is set 330 to a predetermined value. The Q value indicates a level of quantization that will be applied to the coefficient array in the quantize step 340. Typically, the quantize value is initially set to 0 (least quantization) and may be incremented as the process iterates until a final value is determined as will be described below.

The coefficients are quantized 340 according to the Q value. Quantization reduces the number of bits required to represent each coefficient. For example, coefficients may be quantized by right shifting the coefficients in their binary representation by a shift value. In one embodiment, the DC coefficient is not quantized and the AC coefficients are quantized 340 by right-shifting each AC coefficient by the Q value. Each coefficient is additionally shifted by an offset amount given by a predetermined offset array. The offset array indicates the additional number of bits to shift the coefficients. Each coefficient may be shifted by a different value as indicated by the offset array. For example, an offset array may be represented generally by:

$$\text{q\_offset} = \begin{bmatrix} q_{00} & \cdots & q_{0n} \\ \vdots & & \vdots \\ q_{m0} & \cdots & q_{mn} \end{bmatrix}$$

where coefficient $h_{mn}$ is shifted by the Q value plus the corresponding entry in the offset array $q_{mn}$. The offset corresponding to the DC coefficient is typically zero. The entries in the offset array may be experimentally determined. For example, the offset array can be set to minimize perceivable quality loss when frames are compressed and then decompressed.

The quantized coefficients are next encoded 350 using a coding scheme such as, for example, an entropy encoding scheme. Examples of entropy encoding include, among others, Huffman coding, Golomb-Rice coding and arithmetic coding. In these embodiments, the coding provides a compressed representation of the coefficients. An example embodiment uses a Golomb-Rice coding to encode the AC coefficients. The Golomb-Rice code is a family of universal codes with parameter k. An integer n is first mapped to a non-negative integer using the following mapping:

$$r(n) = \begin{cases} 2|n| & \text{for } n \geq 0 \\ 2|n| - 1 & \text{for } n < 0 \end{cases} \quad (3)$$

r(n) is then coded by encoding r(n) mod $2^k$ in binary followed by an encoding of r(n)>>k in unary. The encoding uses k+1+(r(n)>>k) bits. In one embodiment, the parameter k can vary depending on Q and the coefficient position. For example, a k parameter table 1200 may be stored as illustrated in FIG. 12. The k parameter table 1200 provides a different k parameter array 1220 of k corresponding to each possible Q value 1210. Each k parameter array 1220 provides k values for encoding each coefficient of the quantized coefficient array. For example, for a Q value of N, a quantized coefficient $h_{mn}$ will be encoded according to a k-value $k^N_{mn}$.

During quantizing and coding, frequency coefficients to identify the smallest Q value that can be applied to fit the quantized and encoded coefficients in the fixed bucket are temporarily stored. In one embodiment, for example, 13 bits are used to encode the DC coefficient, and 3 bits are used to encode the Q value. To fit into a fixed sized bucket of 128 bits, 112 bits are used to encode the AC coefficients. The process determines 360 if the compressed (quantized and encoded) coefficients fit in the fixed bucket for the current Q value. If they do not, the Q value is incremented 370. The steps 340, 350, 360, 370 repeat until the minimum Q value is found that still allows the coefficients to fit in the fixed bucket. In some embodiments, the number of bits in the compressed coefficients may still exceed the bucket size even when the Q value is at its maximum value. Typically, the compression parameters are configured such that this situation is very rare. However, if the situation does occur, in one embodiment, the decoder 120 zeros all of the AC coefficients and encodes the block using only the DC coefficient.

Once the Q value is determined, the decoder 120 packs 380 the compressed coefficients and the Q value for storage. The process repeats for each block of pixels composing the reference frame until the entire reference frame is compressed. The decoder 120 may store the compressed coefficients to the first reference frame storage 160a or output the compressed data to the processing unit 130.

The reference frames can be decompressed using a reverse process. For example, a compressed block is "unpacked" to extract the DC coefficient, the AC coefficients, and the quantize value. The AC coefficients are decoded to recover the quantized coefficient values. A reverse transform (e.g., a reverse DC-MHT transform) is applied to the quantized coefficients to obtain pixel values. In some cases, the pixel values may not be recovered exactly, because the reverse transform is performed on quantized coefficients. However, as previously described, the quantization levels can be experimentally determined (e.g., in the stored offset array) to minimize any perceivable quality loss.

An advantage of a system (or process) as disclosed is generating a second compressed output format, e.g., H.264, from a first compressed input format, e.g., MPEG-2. The method acts to compress the reference frames by transforming image data into a frequency domain representation and quantizing and encoding the frequency coefficients. The use of a compressed reference frames reduces reference frame storage requirements and reduces memory bandwidth that facilitates real-time processing. In one embodiment, the process selectively quantizes the data in order to minimize perceivable degradation in the video signal. Furthermore, in one embodiment, the encoder 140 and decoder 120 use the same form of reference frame compression. This eliminates drift between the encoder and decoder reference frames and thus minimizes quality loss.

The order in which the steps of the disclosed methods are performed is purely illustrative in nature. The steps can be performed in any order or in parallel, unless otherwise indicated by the present disclosure. The methods may be performed in hardware, firmware, software, or any combination thereof operating on a single computer or multiple computers of any type. Software embodying the disclosure may comprise computer instructions in any form (e.g., source code, object code, interpreted code, etc.) stored in any computer-readable storage medium (e.g., a ROM, a RAM, a flash memory, a magnetic media, a compact disc, a DVD, etc.). Such software may also be in the form of an electrical data signal embodied in a carrier wave propagating on a conductive medium or in the form of light pulses that propagate through an optical fiber.

While particular embodiments have been shown and described, it will be apparent to those skilled in the art that changes and modifications may be made without departing from the principles herein in its broader aspect and, therefore, the appended claims are to encompass within their scope all such changes and modifications, as fall within the true spirit of this disclosure.

Reference in the specification to "one embodiment" or "an embodiment" means that a particular feature, structure, or characteristic described in connection with the embodiment is included in at least one embodiment of the system or method disclosed herein. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure herein also relates to an apparatus for performing the operations herein. This apparatus can be specially constructed for the required purposes (e.g., an application specific integrated circuit (ASIC)), or it can comprise a general-purpose computer selectively activated or reconfigured by a computer program stored in the computer. Such a computer program (e.g., comprised of instructions corresponding to the processes described above and executable by a processor) can be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems can be used with programs in accordance with the teachings herein, or it may prove convenient to construct more specialized apparatuses to perform the method steps. The required structure for a variety of these systems will appear from the description below. In addition, the embodiments disclosed are not described with reference to any particular programming language. It will be appreciated that a variety of programming languages can be used to implement the teachings of the embodiments as described herein. Furthermore, as will be apparent to one of ordinary skill in the relevant art, the modules, features, attributes, methodologies, and other aspects can be implemented as software, hardware, firmware or any combination of the three. Of course, wherever a component is implemented as software, it can be implemented as a standalone program, as part of a larger program, as a plurality of separate programs, as a statically or dynamically linked library, as a kernel loadable module, as a device driver, and/or in every and any other way known now or in the future to those of skill in the art of computer programming.

In the claims, reference to an element in the singular is not intended to mean "one and only one" unless explicitly stated, but rather is meant to mean "one or more." In addition, it is not necessary for a device or method to address every problem that is solvable by different embodiments in order to be encompassed by the claims.

What is claimed is:

1. A method for compressing reference frames in a video transcoder, the method comprising:
   receiving a compressed input stream in a first compressed format;
   decoding the compressed input stream to generate an intermediate stream in an intermediate format, first reference frames in the compressed input stream compressed to intermediate compressed reference frames in the intermediate format, wherein compressing the first reference frames to the intermediate format comprises:
      extracting a two-dimensional block of pixels from one of the first reference frames;
      transforming the two-dimensional block of pixels from a spatial domain to a frequency domain to generate a coefficient array;
      compressing the coefficient array to a fixed bucket size; and
      storing the compressed coefficient array to a reference frame storage; and
   encoding the intermediate stream to generate a compressed output stream in a second compressed format, the intermediate compressed reference frames compressed to second compressed reference frames in the second compressed format.

2. The method of claim 1, further comprising processing the intermediate stream in the intermediate format according to a processing function.

3. The method of claim 1, wherein transforming the two-dimensional block of the pixels comprises:
   applying a two-dimensional transform to the block of pixels, wherein the two-dimensional transform preserves a DC component of the block of pixels.

4. The method of claim 1, wherein compressing the coefficient array to a fixed bucket size comprises:
   quantizing AC coefficients of the coefficient array according to an initial quantize value;
   encoding the quantized AC coefficients of the coefficient array using an entropy encoding;
   determining if the encoded AC coefficients, the quantize value, and a unquantized DC coefficient of the coefficient array fit to the fixed bucket size;
   responsive to the encoded AC coefficients, the quantize value, and the unquantized DC coefficient not fitting to the fixed bucket size, adjusting the initial quantize value to an updated quantize value; and
   responsive to the encoded AC coefficients, the quantize value, and the unquantized DC coefficient fitting to the fixed bucket size, setting current quantize value as a final quantize value.

5. The method of claim 4, wherein quantizing AC coefficients of the coefficient array comprises:
   shifting each AC coefficient of the coefficient array by the final quantize value; and
   further shifting each AC coefficient of the coefficient by an offset value from an offset array, each entry of the offset array corresponding to an entry of the coefficient array.

6. The method of claim 4, wherein encoding the quantized AC coefficients comprises:
   selecting, according to the final quantize value, an encoding parameter array from a table of encoding parameter matrices;
   encoding each AC coefficient of the coefficient array according to an encoding parameter from the encoding parameter array corresponding to the quantize value, each entry of the selected encoding parameter array corresponding to an entry of the coefficient array.

7. The method of claim 4, wherein encoding the quantized AC coefficients comprises applying a Golomb-Rice encoding to the AC coefficients.

8. A non-transitory computer readable storage medium storing instructions thereon for compressing reference frames in a video transcoder, the instructions when executed by a processor cause the processor to execute steps including:
   receiving a compressed input stream in a first compressed format;
   decoding the compressed input stream to generate an intermediate stream in an intermediate format, first reference frames in the compressed input stream compressed to intermediate compressed reference frames in the intermediate format, wherein compressing the first reference frames to the intermediate format comprises:

extracting a two-dimensional block of pixels from one of the first reference frames;

transforming the two-dimensional block of pixels from a spatial domain to a frequency domain to generate a coefficient array;

compressing the coefficient array to a fixed bucket size; and storing the compressed coefficient array to a reference frame storage; and encoding the intermediate stream to generate a compressed output stream in a second compressed format, the intermediate compressed reference frames compressed to second compressed reference frames in the second compressed format.

9. The computer readable storage medium of claim 8, wherein the steps further include further comprising processing the intermediate stream in the intermediate format according to a processing function.

10. The computer readable storage medium of claim 8, wherein transforming the two-dimensional block of pixels comprises:

applying a two-dimensional transform to the block of pixels, wherein the two-dimensional transform preserves a DC component of the block of pixels.

11. The computer readable storage medium of claim 8, wherein compressing the coefficient array to a fixed bucket size comprises:

quantizing AC coefficients of the coefficient array according to an initial quantize value;

encoding the quantized AC coefficients of the coefficient array using an entropy encoding;

determining if the encoded AC coefficients, the quantize value, and an unquantized DC coefficient of the coefficient array fit to the fixed bucket size;

responsive to the encoded AC coefficients, the quantize value, and the unquantized DC coefficient not fitting to the fixed bucket size, adjusting the initial quantize value to an updated quantize value; and responsive to the encoded AC coefficients, the quantize value, and the unquantized DC coefficient fitting to the fixed bucket size, setting current quantize value as a final quantize value.

12. The computer readable storage medium of claim 11, wherein quantizing AC coefficients of the coefficient array comprises:

shifting each AC coefficient of the coefficient array by the final quantize value; and further shifting each AC coefficient of the coefficient by an offset value from an offset array, each entry of the offset array corresponding to an entry of the coefficient array.

13. The computer readable storage medium of claim 11, wherein encoding the quantized AC coefficients comprises:

selecting, according to the final quantize value, an encoding parameter array from a table of encoding parameter matrices;

encoding each AC coefficient of the coefficient array according to an encoding parameter from the encoding parameter array corresponding to the quantize value, each entry of the selected encoding parameter array corresponding to an entry of the coefficient array.

14. The computer readable storage medium of claim 11, wherein encoding the quantized AC coefficients comprises applying a Golomb-Rice encoding to the AC coefficients.

15. A system for compressing reference frames in a video transcoder comprising:

an input port configured to receive a compressed input stream in a first compressed format;

a decoder configured to decode the compressed input stream to generate an intermediate stream in an intermediate format, the decoder configured to compress first reference frames in the compressed input stream to intermediate compressed reference frames in the intermediate format, wherein the decoder is further configured to:

extract a two-dimensional block of pixels from one of the first reference frames;

transform the two-dimensional block of pixels from a spatial domain to a frequency domain to generate a coefficient array;

compress the coefficient array to a fixed bucket size; and store the compressed coefficient array to a reference frame storage;

an encoder configured to encode the intermediate stream to generate a compressed output stream in a second compressed format, the encoder configured to compress the intermediate compressed reference frames to second compressed reference frames in the second compressed format; and an output port configured to output an output stream in the second compressed format.

16. The system of claim 15, further comprising a decoder reference frame storage coupled to the decoder, the decoder reference frame storage configured to store the compressed reference frames.

17. The system of claim 15, further comprising an encoder reference frame storage coupled to the encoder, the encoder reference frame storage configured to store the compressed reference frames.

18. The system of claim 15, further comprising a processor configured to process the intermediate stream in the intermediate format according to a processing function.

* * * * *